March 7, 1961 E. E. LOEBNER 2,974,233
FREQUENCY AND PHASE MODULATION OF OPTICAL FEEDBACK STORAGE LIGHT AMPLIFIERS
Filed Aug. 13, 1959

INVENTOR
EGON E. LOEBNER
BY
Harry M. Saragovitz
ATTORNEY.

2,974,233
Patented Mar. 7, 1961

2,974,233

FREQUENCY AND PHASE MODULATION OF OPTICAL FEEDBACK STORAGE LIGHT AMPLIFIERS

Egon E. Loebner, Princeton, N.J., assignor to the United States of America as represented by the Secretary of the Army Filed Aug. 13, 1959, Ser. No. 833,654
4 Claims. (Cl. 250—213)

This invention relates to optical display devices using electroluminescent and photoconducting solid state elements and specifically to devices for amplifying and/or storing information for an extended period of time.

In recent years, the concentrated research on solid state elements has produced several new and useful components of which diodes, transistors, cryotrons and photoconductors are only a few examples. With the advent of each new component, new circuits are invented which will best utilize the performance capabilities of the component.

Light amplifiers utilizing series connected photoconductive and electroluminescent elements are known. The basic circuit of such an amplifier usually comprises a photoconductor connected electrically in series with an electroluminescent material. An audio frequency alternating voltage source energizes the entire circuit. The resistance of the photoconductor varies inversely with light and the electrical impedance of the electromluminescent material is capacitive at the operating frequency.

For a constant voltage and frequency the amplifier can be made to function as a storage device if a sufficient amount of the electroluminescent output light is fed back onto the photoconductive element. Special structures have been designed to optically feed back a portion or all of the electroluminescent or radiated output light. Some circuits are also known which are capable of accomplishing the image storage function with conventional nonfeedback light amplifying structures. These circuits, however, require switching means and duplicate photoconductive and electroluminescent elements.

The operation of bistable storage light amplifiers, i.e., their ability to function in two stable modes one of which is strongly light generating while the other is essentially non-generating, depends on several parameters. If the feedback light bias and the driving alternating voltage frequency are predetermined, a range of voltage amplitudes can be found for which bistability occurs.

In many applications it is essential that circuit means be provided for readily switching the operation of a light amplifier from a monostable to a bistable mode of operation. This entails the provision of means for varying externally the amount of optical feedback from the electroluminescent cell to the photoconductor.

It is therefore the main object of the present invention to provide a device which can be easily and selectively made to operate either in a monostable or in a bistable mode of operation.

It is another object of this invention to provide an image storing device, utilizing regenerative optical feedback, whose storage capabilities can be predetermined by a simple adjustment of conventional electrical components without appreciably affecting the input-output light characteristics of the device.

The above and other objects of this invention are achieved by the insertion of a phase modulating network in parallel relationship with the photoconducting element to vary the phase of the applied voltage across the photoconductor relative to the applied voltage across the electroluminescent element.

The features of this invention which are believed to be novel are set forth with paticularity in the appended claims. The present invention itself, both as to its organization and manner of operation, together with further objects and advantages thereof may best be understood by reference to the following description taken in connection with accompanying drawings in which like reference characters refer to similar parts and in which:

Figure 1:
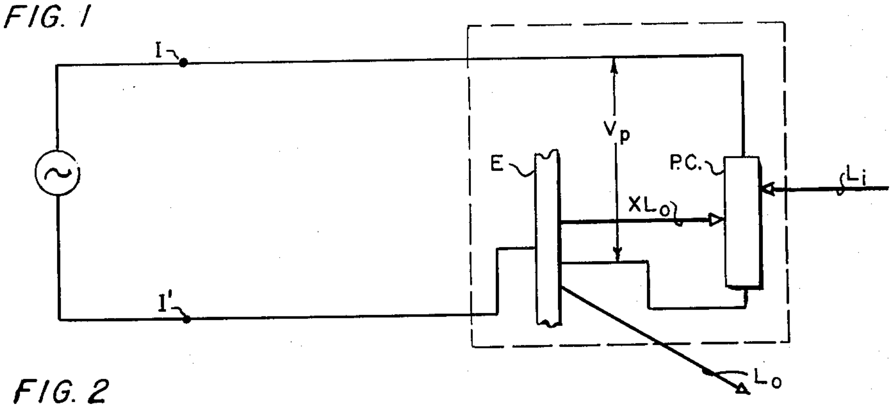
Figure 1 is a known regenerative light amplifier circuit.

In the known circuit of Figure 1, a variable alternating frequency voltage source is electrically connected to input terminals I, I′, of a regenerative light amplifier, shown enclosed within the dashed lines. The regenerative light amplifier comprises a photoconductor P.C. series connected with an electroluminescent emitter E. An incoming light image $L_1$ on the photoconductor P.C. reduces its impedance and allows a greater fraction of the energizing voltage to appear across the emitter E. An increase in voltage across the emitter E produces an amplified output light image $L_o$. When a fraction X of the output light $L_o$ is fed back onto the photoconductor, it is then stored in the regenerating light amplifier. The storage function of the circuit of Figure 1 is extremely important in the design of photoelectric computers and other similar applications. A better understanding of this function may be obtained from an analysis of the curves of Figure 2.

Figure 2:
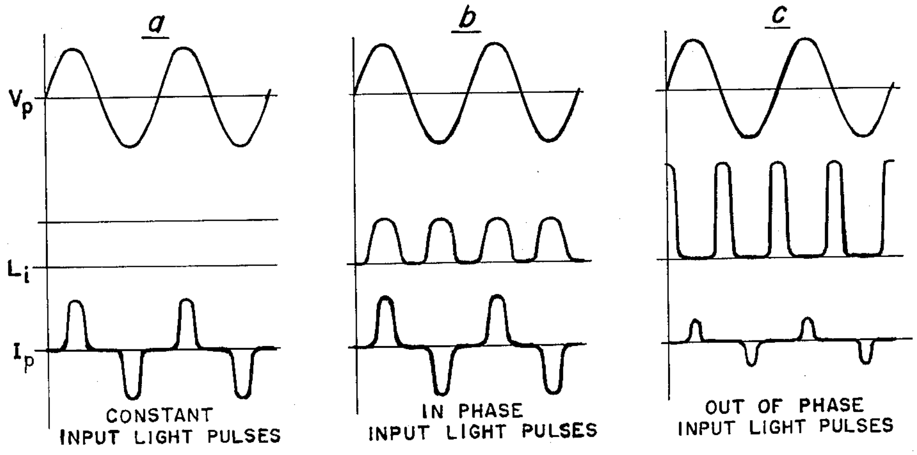
Figure 2 is a graph showing the current in the photoconductor as a function of the applied alternating voltage relative to the phase of the input light.

In Figure 2 are represented on the Y axis of Cartesian coordinates the voltage across the photoconductor, $V_p$, the input light $L_1$ and the current in the photoconductor $I_p$ as a function of time *t*, which is plotted on the X axis.

In Figure 2(*a*), a fraction $V_p$ of the energizing alternating voltage appears across the photoconductor. If the input light $L_1$ is constant, as is shown by the horizontal line, then the photoconductor current $I_p$ will be in phase with the voltage $V_p$. This current is pulsating rather than sinusoidal.

In Figure 2(*b*), the input light consists of pulses in phase with the peaks of the alternating voltage. The resulting pulsating photoconductor current $I_p$ is also is phase with the peaks of the alternating voltage.

In Figure 2(*c*), the input light pulses are 90° out of phase with the applied alternating voltage. The resulting pulsating photocurrent is still in phase with the voltage but its magnitude is greatly diminished.

Thus, as can readily be seen from Figure 2, the magnitude of the output light, which determines the feedback light, depends on the relative phase angle between the input light pulses and the applied alternating voltage across the photoconductor. Since in many feedback amplifiers the amount of light fed back is greater than the input light, it should be understood that the graphs of Fig. 2 also represent $V_p$ and $I_p$ as a function of the feedback light.

It has been discovered that the phase of the alternating voltage across the photoconductor P.C. relative to the voltage across the electroluminescent emitter E is one of the principal factors in determining the storage function of any regenerative light amplifying structure, i.e., the amount of light fed back from the emitter onto the photoconductor.

Figure 3:
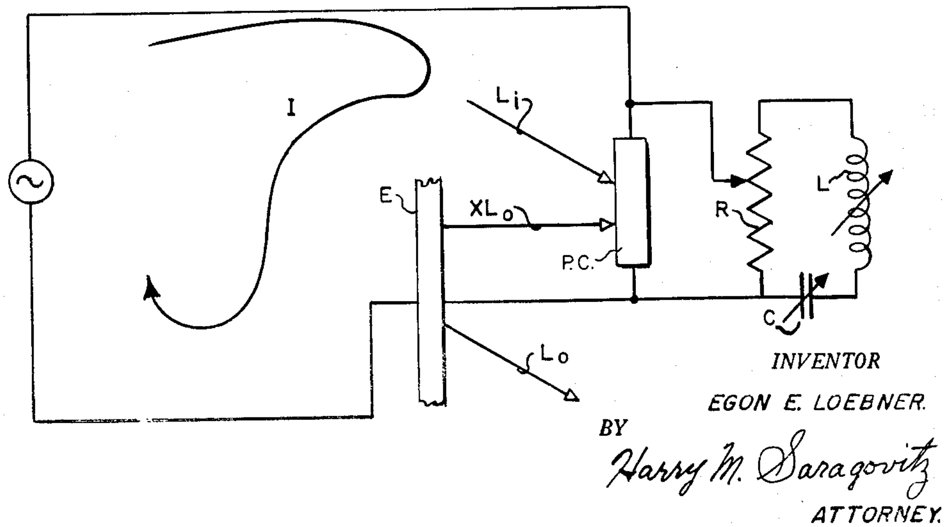
Figure 3 is a schematic circuit of one embodiment of this invention wherein a phase modulating network is connected in parallel with the photoconductor and energized by a variable frequency alternating voltage source.

In Figure 3 is shown a simple phase modulating network connected across the photoconductor P.C. The network comprises a tank circuit consisting of a resistor R, and inductor L and a capacitor C, all variable. The output terminals of the resistor are connected directly across the electrodes of the photoconductor. Although a simple phase modulating network is shown, it should be understood that any other network accomplishing the same function may be used.

In operation, the complex impedances of the photoconductor P.C. and the electroluminescent emitter E determine the magnitude and the phase angle of the circulating current I. The phase modulating network across the photoconductor in turn determines the phase of the photoconductor voltage relative to the emitter voltage. For each particular regenerative light amplifying structure, the values of R, L and C can be experimentally determined for optimum storage efficiency. Also, the variable elements in the tank circuit can be calibrated as a function of storage efficiency. Thus, just as the output light $L_o$ in Figure 2(*c*) depends on the relative phase between the alternating voltage across the photoconductor and the light pulses applied thereon, the output light, and therefore the amount of light fed back in Fig. 3, depends on the phase of the photoconductor voltage relative to the emitter voltage. Although only one regenerative light amplifier is shown in Fig. 3, it should be understood that several such amplifiers may be connected in parallel circuit relationship. A phase modulating network would then be connected across each photoconductor for optimum storage efficiency, or a single modulating network across a plurality of photoconductors for optimum simplicity.

What is claimed is:

1. In an electroluminescent storage circuit including an electroluminescent emitter in light exchange relation with a photoconductive material, means for applying an audio frequency energizing voltage to said circuit, there being a first phase relationship between said energizing voltage and the voltage appearing across said emitter and a second phase relationship between said energizing voltage and the voltage appearing across said photoconductor and means in said circuit connected across said photoconductor for varying the amount of light fed back from said emitter onto said photoconductor.

2. The electroluminescent storage circuit of claim 1 wherein said last named means is a tank circuit including variable resistive and reactive elements.

3. The storage circuit of claim 2 wherein said variable resistive and reactive elements are calibrated in units of storage efficiency.

4. An electroluminescent storage circuit comprising: an electroluminescent emitter; a photoconductor coupled in optical feed-back relationship with said emitter and electrically in series with said emitter; a source of alternating voltage connected across said circuit; and means for varying the amount of light fed back from said emitter to said photoconductor; said last named means consisting of a variable resistance-inductance-capacitance network connected across said photoconductor for imparting a predetermined phase-shift between the voltage appearing across said element and the voltage appearing across said photoconductor, the amount of said feedback being directly related to the degree of said phase-shift.

References Cited in the file of this patent

UNITED STATES PATENTS 2,836,766 Halstead ............... May 27, 1958